No. 896,924. PATENTED AUG. 25, 1908.
G. LIEB.
MACHINE FOR CUTTING JEWELERS' SOLDER.
APPLICATION FILED MAR. 3, 1908.
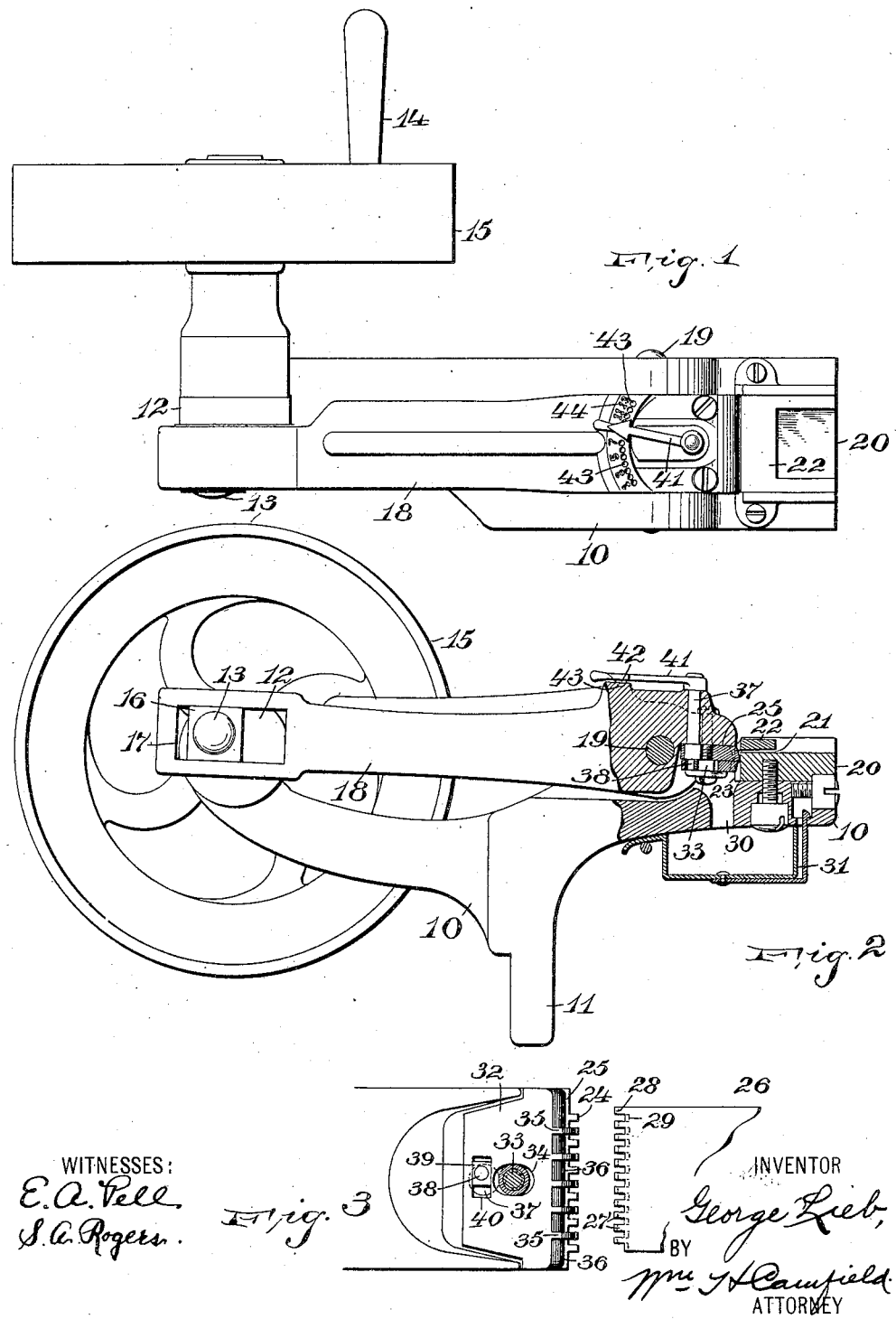
WITNESSES:
E. A. Pell
S. C. Rogers
INVENTOR
George Lieb,
BY
Wm. J. H. Camfield
ATTORNEY

UNITED STATES PATENT OFFICE.

GEORGE LIEB, OF NEWARK, NEW JERSEY.

MACHINE FOR CUTTING JEWELERS' SOLDER.

No. 896,924.          Specification of Letters Patent.          Patented Aug. 25, 1908.

Application filed March 3, 1908. Serial No. 418,944.

*To all whom it may concern:*

Be it known that I, GEORGE LIEB, a citizen of the United States, residing at Newark, in the county of Essex and State of New Jersey, have invented certain new and useful Improvements in Machines for Cutting Jewelers' Solder; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a machine for cutting jeweler's solder, which solder is required in small pieces by the jeweler, and the machine is designed to take a strip of this solder and cut it off in a notched configuration to form, on each succeeding cut, a small piece of solder, and in this way the toothed projections and the part bordering on the recesses between the toothed projections are gradually cut away and deposited and then used by the jeweler in completing different articles.

The invention is further designed to provide a machine of this class that has a means for adjusting the size of the cuts so as to regulate how large a piece of solder shall be cut off on each cut, and further to provide the quick, positive and easily accessible means for regulating the machine as to the size of the cut, and also to provide a visual indicator to show what size of solder the machine, as it is set, will cut.

The invention is illustrated in the accompanying drawing, in which

Figure 1 is a top view of my improved solder cutting machine. Fig. 2 is a side view thereof with the cutting end shown in section, and Fig. 3 is a bottom view of the cutting jaw and the end of a strip of solder that has been cut by the jaw.

The machine comprises a body portion 10 which has a depending lip 11 to provide for its attachment to a bench, or by means of which it can be held into a vise, or similarly fixed in place. Mounted on the frame 10 is a shaft 12 having a crank 13 thereon and is operated by a handle 14 on a balance wheel 15. A block 16 works in the slot 17 in the lever 18 to rock the lever on the pin 19. On the front end of the body portion 10 is a block 20 through which the jeweler's solder is fed passing in through a channel 21 having the top 22, the jeweler's solder being readily passed therethrough, it being made in strips that are thin and flat and readily passed through the channel 21. The block 20 is provided, on its rear face, with notches 23 which come in register with projections 24 on the plate 25, the edge of the block 20 in the plate 25 thereby having a shearing action to cut off the strip of solder 26 shown in Fig. 3 to form the projections 27, and on each successive cut a piece 28 is cut from the front of the projections 27 and a small piece 29 is cut from the material bordering on the back of the recesses between the projections 28, and in this way small rectangular or other shaped pieces are cut and passed down preferably through an opening 30 into any suitable receptacle 31, suitably secured and detachably arranged underneath the machine.

To provide for the adjustment of the size to cut, the width of the cut is not altered, but the depth of the cut into the strip of solder is regulated by fixing the distance the solder can be forced into the machine, by the operator, at each succeeding cut. To accomplish this I secure a plate 32 on the bottom of the plate 25, the plate 32 being held in place by a suitable screw 33 which works in the slot 34 in the plate 32, the slot allowing for the backward and forward movement of the plate 32. The plate 32 has fingers 35 which are in register with all or some of the projections 24, and against these is forced the material from which the portions 29 are cut from the strip of solder 26, and it will thus be seen that as these fingers retreat with the plate, so will the cut of solder be deepened to make a larger piece. The front of the projections 28 at the same time also register against the edge 36 of the plate 32, so that the whole strip is evened off and is kept level so that the same depth of cut is made at each point along the width of the strip. To slide the plate 32 I provide a shaft 37 which has, at its bottom edge, an eccentric 38 sliding in a block 39 which in turn is placed in a slot 40 in the plate 32, and it will thus be seen that as this shaft rotates, so is the plate pushed forward or backward. A lever 41 on the top of the shaft 37 has a little knob 42 which fits into any of the recesses 43 in the lever 18 to steady the lever in any of its positions. The numerals 44 can be placed on the machine to indicate the relative difference in sizes between the cuts to be made.

This machine is positive, is easily operated by the lever 41, and it also has the visual numerals whereby the size of the cuts are always known to the operator.

Having thus described my invention, what I claim is:—

1. A machine for cutting jeweler's solder comprising a body portion having a block with a cutting edge thereon, a lever rocking on the frame and having a plate with a cutting edge to register with the cutting edge of the block, means for operating the lever, a plate sliding on the cutting plate and adapted to limit the entering of a strip of solder between the cutting plate and the cutting block, means for operating the sliding plate, and a visual indicator on the operating means.

2. A machine for cutting jeweler's solder comprising a body portion having a block with a cutting edge and means for guiding a strip of solder therein, a lever rocking in the body portion, means for operating the lever, a plate having a cutting edge to have a shearing action on the cutting edge of the block, a plate sliding on the cutting plate, a shaft passing through the lever, means on one end of the shaft for a sliding plate, and means on the projecting end of the shaft for operating it.

3. A machine for cutting jeweler's solder comprising a body portion having a block with a cutting edge thereon and means for guiding a strip of solder, a lever rocking in the body portion, a plate on the lever having a cutting edge to shear with the cutting edge of the block, the cutting edges of the block and the plate having recesses to form alternate projections operating to cut a series of notches in a strip of solder, a sliding plate having fingers resting on the projections of the cutting plate, a shaft in the lever, an eccentric on the end of the shaft and engaging the sliding plate to operate it, an operating lever on the projecting end of the shaft, and means for locking the lever in its adjusted positions.

4. A machine for cutting jeweler's solder comprising a body portion having a block with a cutting edge thereon and means for guiding a strip of solder, a lever rocking in the body portion, a plate on the lever having a cutting edge to shear with the cutting edge of the block, the cutting edges of the block and the plate having recesses to form alternate projections operating to cut a series of notches in a strip of solder, a sliding plate having fingers resting on the projections of the cutting plate, the sliding plate having a transverse slot, a block in the slot, a shaft in the lever, a pin mounted eccentrically on the shaft and entering the block in the slot with the sliding plate, and means on the projecting end of the shaft for operating it.

5. A machine for cutting jeweler's solder comprising a body portion having a block with a cutting edge thereon and means for guiding a strip of solder, a lever rocking in the body portion, a plate on the lever having a cutting edge to shear with the cutting edge of the block, the cutting edges of the block and the plate having recesses to form alternate projections operating to cut a series of notches in a strip of solder, a sliding plate having fingers resting on the projections of the cutting plate, the sliding plate having a transverse slot, a block in the slot, a shaft in the lever, a pin mounted eccentrically on the shaft and entering the block in the slot with the sliding plate, a lever on the projecting end of the shaft, a knob on the lever, and means on the knob of the lever to lock the operating lever in its various positions.

In testimony, that I claim the foregoing, I have hereunto set my hand this 2nd day of March 1908.

GEORGE LIEB.

Witnesses:
  WM. H. CAMFIELD,
  E. A. PELL.